(12) United States Patent
MacCagnan et al.

(10) Patent No.: US 11,660,797 B2
(45) Date of Patent: May 30, 2023

(54) EXTRUDER DEVICE FOR MULTI-LUMEN TUBULAR PRODUCTS

(71) Applicant: GIMAC DI MACCAGNAN GIORGIO, Castronno (IT)

(72) Inventors: Giorgio MacCagnan, Castronno (IT); Lorenzo Gatti, Castronno (IT); Tiziano Capelletti, Castronno (IT)

(73) Assignee: GIMAC DI MACCAGNAN GIORGIO, Castronno (IT)

( * ) Notice: Subject to any disclaimer, the term of this patent is extended or adjusted under 35 U.S.C. 154(b) by 140 days.

(21) Appl. No.: 16/464,886

(22) PCT Filed: Nov. 27, 2017

(86) PCT No.: PCT/IB2017/057420
§ 371 (c)(1),
(2) Date: May 29, 2019

(87) PCT Pub. No.: WO2018/100480
PCT Pub. Date: Jun. 7, 2018

(65) Prior Publication Data
US 2019/0389113 A1    Dec. 26, 2019

(30) Foreign Application Priority Data

Nov. 29, 2016   (IT) .................. 102016000120563

(51) Int. Cl.
*B29C 48/32* (2019.01)
*B29C 48/11* (2019.01)
(Continued)

(52) U.S. Cl.
CPC .............. *B29C 48/32* (2019.02); *B29C 48/11* (2019.02); *B29C 48/0018* (2019.02);
(Continued)

(58) Field of Classification Search
CPC ......... B29C 48/00; B29C 48/10; B29C 48/11; B29C 48/30; B29C 48/32; B29C 48/0017;
(Continued)

(56) References Cited

U.S. PATENT DOCUMENTS 938,047 A * 10/1909 Fish, Sr. ............... B29C 48/345
425/467
3,453,688 A * 7/1969 Carter .................... D01D 1/065
425/131.5
(Continued)

FOREIGN PATENT DOCUMENTS

CN        102615805 B    1/2015
EP        1779811 A1     5/2007
(Continued)

OTHER PUBLICATIONS

Machine English Translation of JPH0393523A (Year: 1991).*
(Continued)

*Primary Examiner* — Francisco W Tschen
*Assistant Examiner* — Edgaredmanuel Troche
(74) *Attorney, Agent, or Firm* — J. Miguel Hernandez; James R. Gourley; Carstens, Allen & Gourley, LLP

(57) ABSTRACT

An extruder for multi-lumen tubular products with multi-coronal arrangement comprises a main body (2) defining a passage cavity (2a) and an average outflow direction (2b), as well as an input surface (3) and an exit surface (4) respectively formed on opposite faces of the main body (2) and defining respective entry areas afferent to and efferent from the passage cavity (2a); the extruder further comprises an expansion portion (4a) associated with the exit surface (4) and adapted to mutually orient spontaneous expansive flows of said extrusion material through the exit surface (4) in reciprocal directions of mutual intersection.

13 Claims, 3 Drawing Sheets

Figure 1:
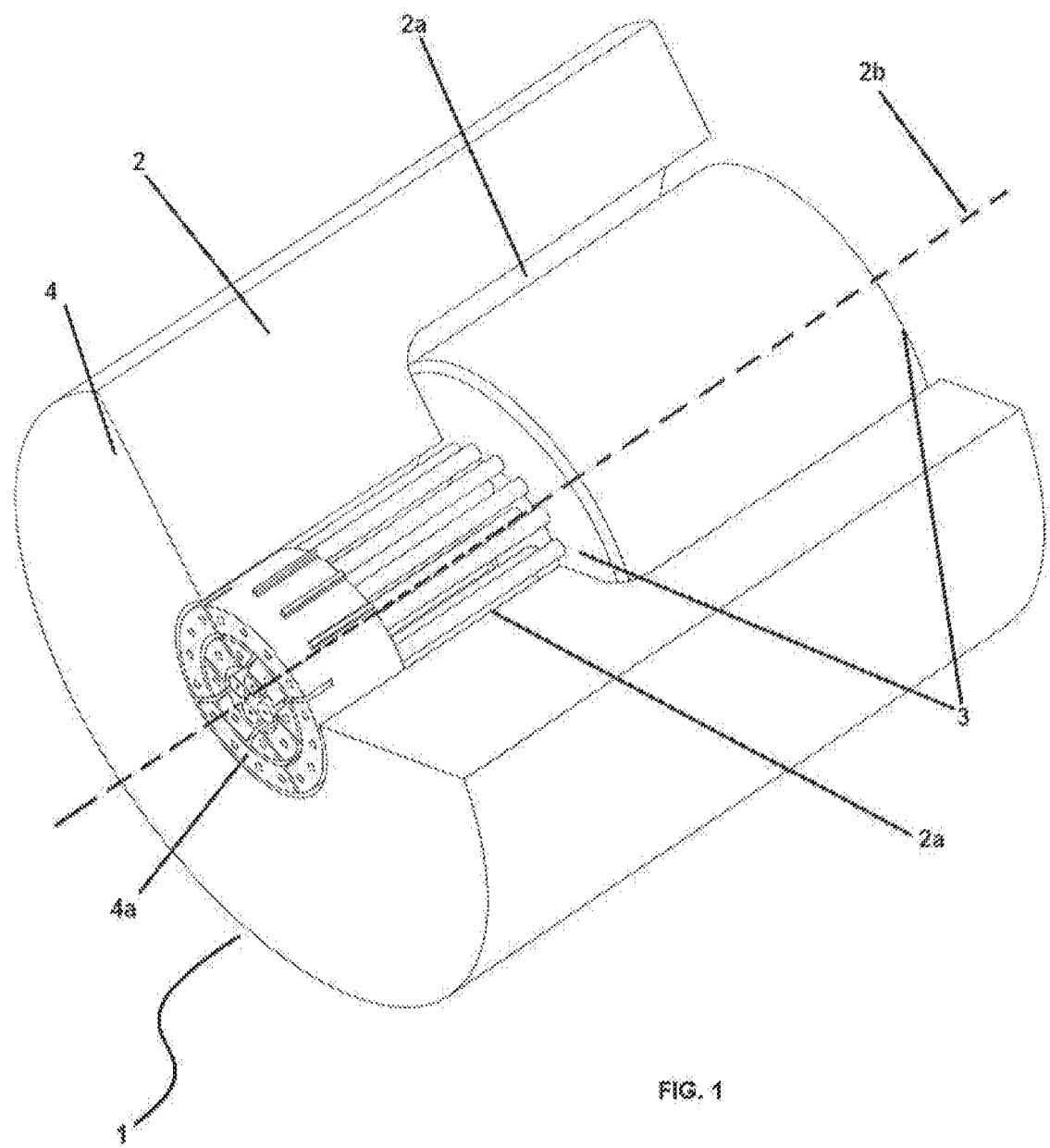

(51) Int. Cl.
*B29C 48/00* (2019.01)
*B29L 23/00* (2006.01)
*B29C 48/10* (2019.01)
*B29C 48/25* (2019.01)
*B29C 48/30* (2019.01)

(52) U.S. Cl.
CPC .......... *B29C 48/10* (2019.02); *B29C 48/2566* (2019.02); *B29C 48/25686* (2019.02); *B29C 48/3001* (2019.02); *B29L 2023/001* (2013.01)

(58) Field of Classification Search
CPC ..... B29C 48/0018; B29C 48/03; B29C 48/09; B29C 48/335; B29C 48/3366; B29C 48/338; B29C 48/25686; B29L 2031/60; B29L 2023/00; B29L 2023/001
USPC .............................. 425/113, 131.1, 190, 516
See application file for complete search history.

(56) References Cited

U.S. PATENT DOCUMENTS

| | | | | |
|---|---|---|---|---|
| 3,461,197 | A * | 8/1969 | Lemelson | B29C 45/16 264/171.11 |
| 3,464,450 | A * | 9/1969 | Francesco | F16L 9/18 138/172 |
| 3,767,338 | A * | 10/1973 | Soderlund | A21C 3/04 425/131.1 |
| 4,373,886 | A * | 2/1983 | Hehl | B29C 45/2725 425/130 |
| 4,459,094 | A * | 7/1984 | Sanabria | C11D 13/18 425/462 |
| 4,465,481 | A | 8/1984 | Blake | |
| 5,279,546 | A | 1/1994 | Mische et al. | |
| 5,935,159 | A * | 8/1999 | Cross, Jr | A61N 1/056 607/116 |
| 6,258,396 | B1 * | 7/2001 | Deutsch | A21C 11/16 426/449 |
| 6,564,831 | B1 * | 5/2003 | Sanoner | B29C 48/11 138/DIG. 11 |
| 6,878,324 | B2 * | 4/2005 | Akutagawa | A23G 3/20 264/148 |
| 8,162,644 | B2 * | 4/2012 | Kudo | B29D 30/38 425/72.1 |
| 8,840,389 | B2 * | 9/2014 | MacCagnan | B29C 48/33 425/132 |
| 9,358,599 | B2 * | 6/2016 | Mettee, II | B29C 48/11 |
| 9,717,472 | B2 * | 8/2017 | Ahmed | A61B 5/02158 |
| 10,220,185 | B2 * | 3/2019 | Sadik | A61L 29/041 |
| 10,258,763 | B2 * | 4/2019 | Grasse | A61B 18/1492 |
| 2002/0095203 | A1 * | 7/2002 | Thompson | A61F 2/95 623/1.11 |
| 2010/0323049 | A1 * | 12/2010 | Langlais | B29C 48/327 425/113 |
| 2014/0183006 | A1 * | 7/2014 | Tully | B29C 48/33 29/428 |
| 2014/0284838 | A1 * | 9/2014 | Pfeffer | A61M 25/0012 264/172.15 |
| 2015/0283357 | A1 * | 10/2015 | Lampropoulos | B32B 37/0038 604/523 |

FOREIGN PATENT DOCUMENTS

| | | | |
|---|---|---|---|
| EP | 1938949 A2 | 7/2008 | |
| EP | 2138201 A2 | 12/2009 | |
| JP | H0393523 A * | 4/1991 | ............. B29C 48/32 |
| JP | H0393523 A | 4/1991 | |
| JP | 2012187550 A | 10/2012 | |
| JP | 2016087971 A | 5/2016 | |

OTHER PUBLICATIONS

PCT Search Report from PCT/IB2017/057420 dated Apr. 11, 2018 (3 pages).
English machine translation of JP 2012-187550 published on Oct. 4, 2012 (20 pages).
English machine translation of Notice of Reasons for Refusal for Japanese patent application No. 2019-528713 dated Nov. 18, 2021 (9 pages).

* cited by examiner

EXTRUDER DEVICE FOR MULTI-LUMEN TUBULAR PRODUCTS

The present invention relates to an extruder for making tubular articles with highly specific geometric/dimensional characteristics, such as for example a "multi-lumen" cross-section (i.e., defining multiple passage sections within a maximum perimeter), wherein the passing openings are arranged on multiple concentric crowns, and which may also have different macro- or microscopic dimensions both in terms of maximum external diameter and of overall number of internal passage openings (and also of angular distance between adjacent openings or again in terms of internal diameters of the individual passage openings themselves).

As is known, tubular products and micro-products with multi-lumen sections can be used in various fields, from medical applications to other engineering fields where considerable dimensional precision is required and where extremely strong structure and passage characteristics are required.

To date, the manufacture of extruded tubular products of particularly small dimensions or with particularly complex internal architectures must take into account the fact that the materials—usually polymeric—used in the manufacturing processes are used in extremely reduced amounts, and therefore during the passage in the forming head are extremely sensitive to thermal profiles as well as to all possible elements of environmental disturbance (turbulence in the flow of the material, thermal gradients, atmospheric and/or environmental elements around the forming head and so on).

The problems of very high sensitivity to the environmental/efflux parameters reflect in turn into problems of geometric and precision coherence of the extruded product (or micro-product), which may have internal walls that are not perfectly linear or with non-constant thicknesses and linearities, and in the most obvious cases it can even present occlusions or total collapses in the cross-section.

The present invention therefore intends to devise an extruder device which allows to overcome the aforementioned drawbacks, and in particular which allows to obtain multi-lumen tubular products with particularly small dimensions and/or with multi-coronal arrangement of the various passage openings, all with very high geometric/dimensional precision characteristics, with sufficiently high production rates and with high reliability and durability of the extrusion/forming plant.

For the purposes of the present invention it should be specified that "multi-coronal arrangement" of the passage openings inside a section of an extruded product (or micro-product) means an arrangement of passage openings along two or more concentric circumferences with differentiated radii: these circumferences are obviously inscribed within a circumference of maximum radius defined by the outer surface of the extruded product itself.

A further object of the present invention is to provide a forming/extrusion device which can be advantageously integrated with other functional modules, for example a precision module and/or a localized temperature module, in order to guarantee further operating margins in terms of accuracy and reliability.

The mentioned technical task and the specified aims are substantially achieved by an extruder/micro-extruder device having the characteristics mentioned in one or more of the appended claims, and in any case disclosed hereinafter.

Figure 2:
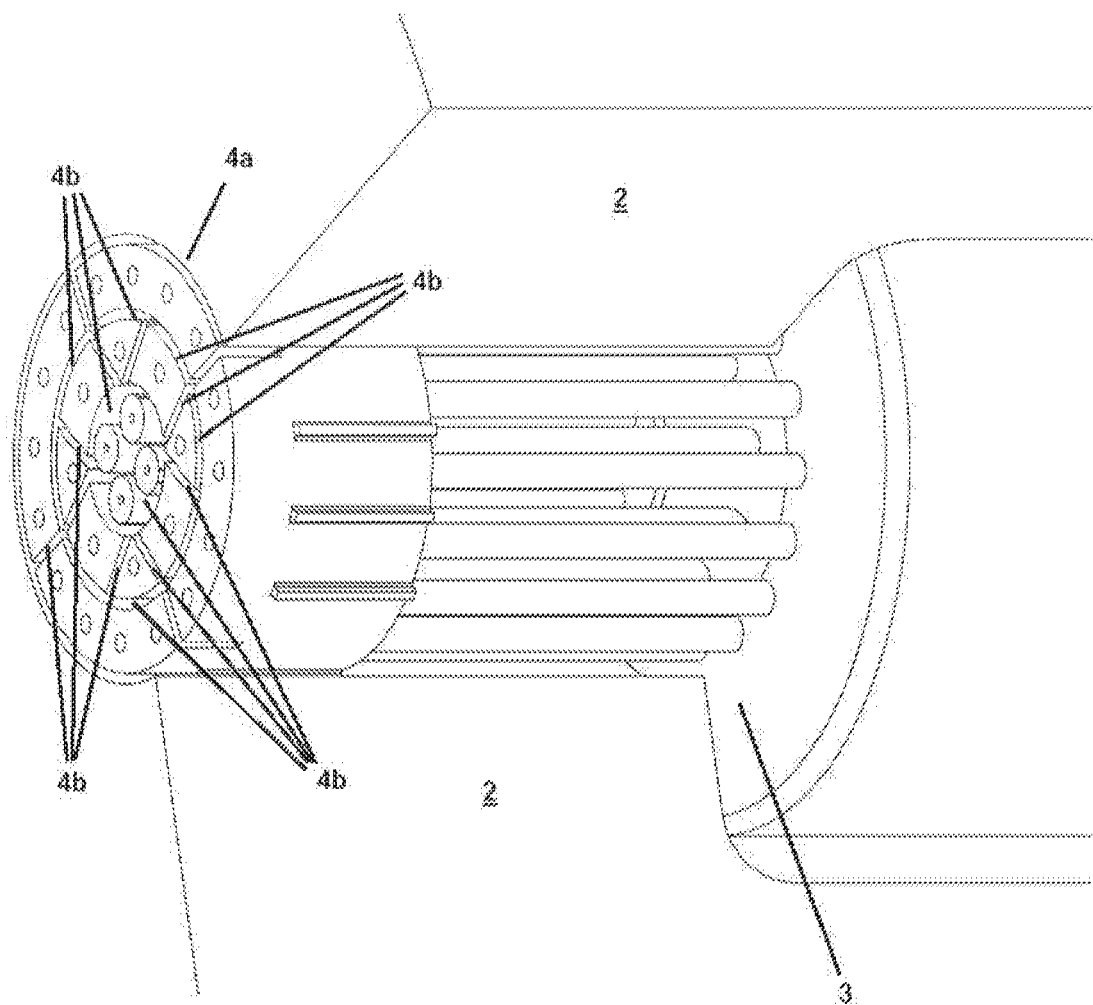
Figure 3:
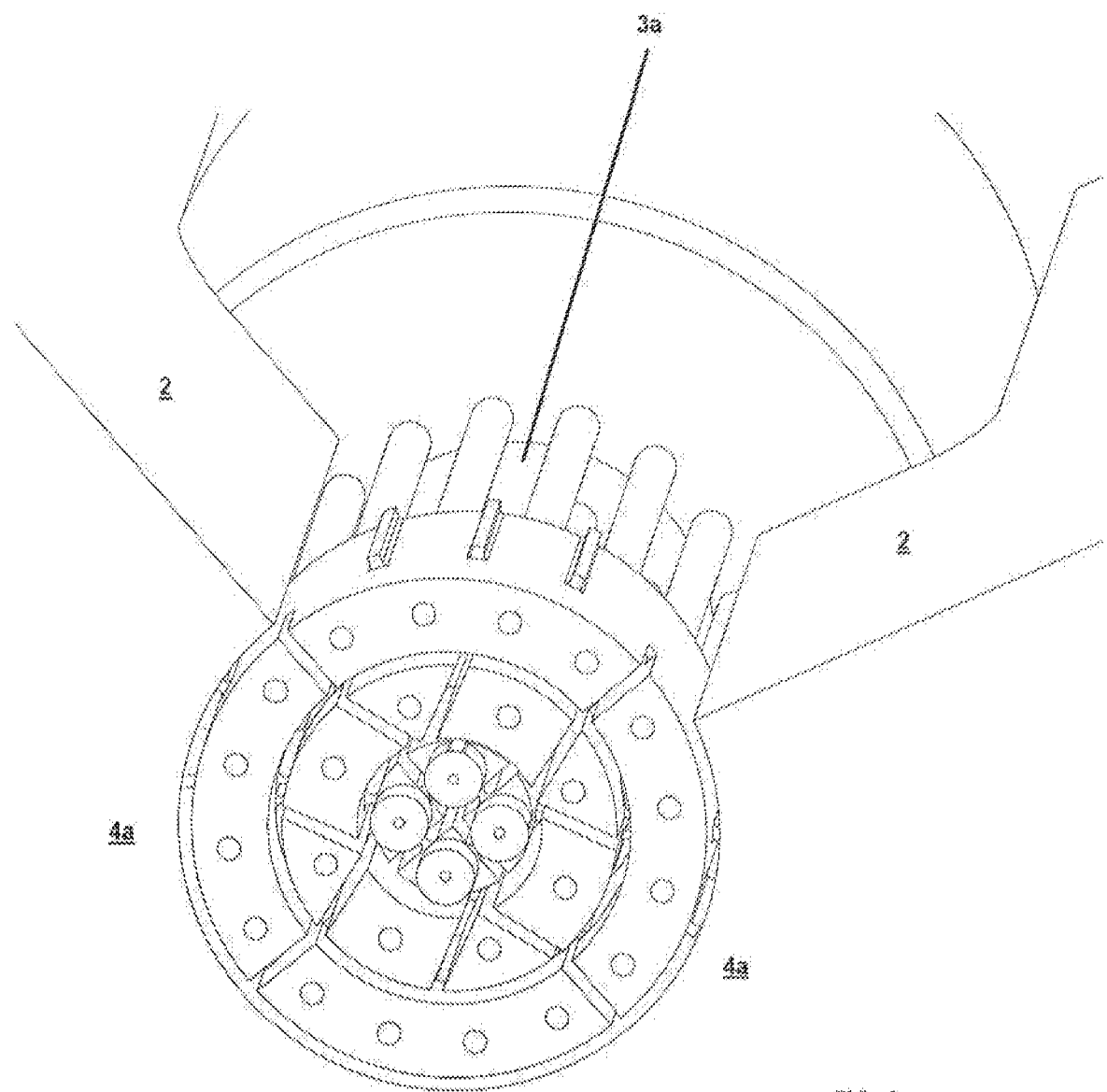

Below is set forth the disclosure of a preferred but not exclusive embodiment of a device according to the invention, by way of example and not of limitation, of a device according to the invention, which is shown in the appended figures, wherein:

FIG. 1 shows a partial cut through of the forming head according to the invention; and FIGS. 2 and 3 show respectively two enlargements of the partial section illustrated in FIG. 1 from different angles.

With reference to the appended figures, the device according to the present invention basically comprises a main body 2 defining a passage cavity 2a and thus defining also an average outflow direction 2b: said main body 2 can be positioned at the end of an extrusion line, such that the passage cavity 2a is penetrable by an extrusion material.

The main body 2 defines in turn an input surface 3 (obtained on a first face of the main body 2), on which there is a plurality of entry areas afferent to the passage cavity 2a as well as an exit surface 4 (obtained on a second face of the main body, opposite to the first face) and defining a plurality of exit portions efferent from the passage cavity 2a and advantageously further comprising an expansion portion (4a) operatively associated with the exit surface (4) and adapted to mutually orient spontaneous expansive flows (or in currently used words in this technical field, the so-called expansive flows related to the "die swell" phenomenon) of the extrusion material through the exit surface (4) in reciprocal directions of mutual intersection.

In other words, the invention envisages making an extruder whose head has, along its axis of development, a portion of dimensions carefully shaped and calibrated so as to allow spontaneous reunion of the partial flows of material through the different passage openings: this reunion (or more accurately, the different local reunions radially distributed in the overall passage section) allows the creation of separation walls—by complementarity defining the passage openings of a multi-lumen extruded product—having thinnesses and mutual closeness ratios that would otherwise be impossible to define by directly imparting a forming through traditional passage openings (i.e. with such sizing that their cavities correspond identically to the "definitive" shape/section of the extruded product).

In order to further explain the present invention, reference should be made to the fact that usually a given shape/section made by extrusion derives from a passage opening which is exactly complementarily shaped to the desired shape/section: conversely, this invention does not provide which are shaped exactly as definitive passage forms/sections that must be found in the finished extruded product, but teaches to realize the "voids" of the passage openings, also taking into account the typical dilatations of the polymer flows in the plastic state, occurring when the latter come out of structures with ducts having "bound" sections.

Going back now to the structural aspect of the invention, it can be seen in the accompanying exemplary figures that the expansion portion 4a is geometrically shaped according to a plurality of slots (4b) segmented and mutually arranged according to a matrix scheme: for example, such slots 4b can be shaped like an arc of circle or having a curved line, or still may be shaped according to substantially straight segments.

Thanks to the various possible combinations of the above-listed conformations, it is possible to obtain mutual intersections between spontaneous expansive flows (and therefore, as already mentioned above, it is possible to exploit the "die swell" phenomena) in a space defined by the expansion portion 4a in the absence of contact with walls of the expansion portion 4a itself.

Still at the level of realization possibilities, it should be noted that the expansion portion 4a can define, typically through a closed polygonal succession of slots (4b) shaped like an arc of circle or having a curved line, at least one coronal circumference having an average diameter smaller than a maximum diameter of a product achievable through the device 1: as a matter of facts, this section topology of the extruded product exploiting the present invention is rather critical to obtain with forming heads having a direct and two-way geometric correspondence between the surfaces of the extrusion openings and the shapes/sections of the extruded structures coming out of them.

If the topology of the extruded product is even more complex, the expansion portion 4a defines (for example, through a radial arrangement of slots 4b having substantially straight segments) at least one cross member radially arranged respect to at least a coronal circumference having an average diameter less than or equal to a maximum diameter of a product manufacturable through the device 1.

Still, it is possible according to the present invention that the passage cavity 2a is defined by a plurality of substantially parallel axial conduits, these axial conduits emerge at the central portions of the slots 4b defining the expansion portion 4a.

Conveniently and according to the requirements of the moment, the segmented slots 4b defining the expansion portion 4a can be geometrically interconnected at least in pairs in correspondence of the respective ends or can be geometrically separated, but placed in a mutual proximity relation, at least in pairs in correspondence of respective ends (so as to effectively exploit the die swell phenomena only where they are "locally" necessary in the overall section of the extruded product).

Also from the structural point of view, an guiding portion 3a may be present, which is geometrically shaped according to a matrix scheme and is adapted to guide the extrusion material flows through the plurality of axial conduits defining the passage cavity 2a: in addition, where it is necessary the addition of "volumizing" material to define and keep stable the empty configuration of one or more passage openings in the extruded product, there may be appropriate insufflation means operatively active in the main body 2 and interposed between the axial conduits of the latter to enter a filler flow between the walls of the product manufacturable through the device 1 at least at the exit surface 4 (according to the technical implementation requirements, this filler flow can be of inert gas or air, or of an incompressible fluid or still of inert solid/granular fillers such as sand or sacrificial materials such as, for example, suitable polymers or aggregates which are then subjected to pyrolysis with relative elimination of the ashes . . . or more generally substances that can be chemically degraded and thus equally eliminated).

The invention achieves several advantages.

Firstly, thanks to the peculiar constructive architecture of the forming head, it is possible to operate with very high precision, defining a wide variety of passage openings arranged on multi-coronal radial schemes and with extremely thin walls and having a very high level of planarity (on the radial walls) or having a very high level of constancy of curvature (on the circumferential walls).

At the same time, the peculiar mode of cooperation of the various ducts of the device ensures optimal post-extrusion control of the product, which is maintained in a sufficiently stable form at least for the time during which the polymeric material is subjected to chemical-physical stabilization: in other words, the optimal mutual arrangement of the passages of the extrusion material and of those dedicated to the "filler flow" allow to maintain accuracy of processing and, with the appropriate modifications, a wide variety of conformations.

Moreover, the versatility of the present invention must be seen in two equally advantageous and possibly combinable aspects: one aspect is linked to the possibility of obtaining very complex multi-lumen internal architectures (and with passage openings of different shapes, not necessarily polygonal but also, for example, perfectly circular or in any case curvilinear) and the another aspect is that of obtaining multi-lumen tubes with "single-crown" arrangement but with extremely small dimensions.

Finally, it should be noted that the present invention allows to maintain low production costs of the device and also allows to obtain a high operating life: this makes possible an industrial process being highly efficient and having very rapid amortization, thus generating a further reduction of costs and a consequent increase in profitability.

The invention claimed is:

1. Extruder device for multi-lumen tubular products with multi-coronal arrangement, including:
   a main body defining a passage cavity and an average outflow direction, said main body being positionable at the end of an extrusion line, said passage cavity being penetrable by an extrusion material;
   an entry surface formed on a first face of the main body and defining a plurality of entry areas afferent to said passage cavity; and
   an exit surface formed on a second face of the main body, opposite to said first face, and defining a plurality of exit areas efferent from said passage cavity, characterized in that: it further comprises an expansion portion operatively associated with the exit surface and adapted to mutually orient spontaneous expansive flows of "die swells" of said extrusion material through the exit surface in reciprocal directions of mutual intersection; and
   said expansion portion defines an arrangement of passage openings arranged along at least two concentric coronal circumferences having respective differentiated medium radii, said at least two concentric coronal circumferences defining two respective mean diameters which are smaller than a maximum diameter and positioned within said maximum diameter, said maximum diameter being defined by the outer surface of an extruded product which can be obtained through the device, and comprising a guiding portion geometrically shaped according to a matrix pattern, and adapted to guide the extrusion material flows through a plurality of axial conduits defining the passage cavity.

2. The device according to claim 1, wherein said expansion portion is geometrically shaped to form a plurality of slots segmented and mutually arranged according to a matrix scheme, said slots comprising a predetermined number of slots shaped as an arc of a circle or having a curved line and a predetermined number of slots having substantially straight segments, said mutual intersections of said spontaneous expansive flows of "die swells" being in a space defined by the expansion portion in absence of contact with walls of the expansion portion.

3. The device according to claim 1, wherein the expansion portion defines said at least two concentric coronal circumferences through a closed polygonal succession of slots shaped like an arc of a circle or having a curved line.

4. The device according to claim 1, wherein the expansion portion defines said at least two coronal circumferences through a radial arrangement of slots having substantially straight segments, at least one cross member radially arranged with respect to at least one of said coronal circumferences having an average diameter less than or equal to a maximum diameter of an extruded product manufacturable through the device.

5. The device according to claim 1, wherein the passage cavity is defined by a plurality of substantially parallel axial conduits, said axial conduits emerging at the central portions of slots defining the expansion portion.

6. The device according to claim 1, wherein segmented slots defining the expansion portion are geometrically interconnected, at least pairwise, at respective ends.

7. The device according to claim 1, wherein segmented slots defining the expansion portion are geometrically separated, but arranged in a mutual proximity relationship, at least pairwise, at respective ends.

8. The device according to claim 1, wherein there are also insufflation means operable in the main body and interposed between axial conduits of the main body to enable a filler flow to enter between the walls of the extruded product manufacturable through the device at least at the exit surface.

9. The device according to claim 8, wherein said insufflation means are adapted to convey a fluid filler material or a filler material in the solid state, which can be discharged preferably by pyrolysis or chemical decomposition, said filler material defining said filler flow.

10. The device of claim 1, the device configured to produce a multi-lumen, tubular, extruded product with linear internal walls.

11. Method of making a multi-lumen, tubular, extruded product, the method comprising
 extruding an extrusion material through the exit surface of the device of claim 1 to produce a multi-lumen, tubular, extruded product with linear internal walls.

12. Method of making a multi-lumen, tubular, extruded product, the method comprising
 causing an extrusion material to exit the exit surface of the device of claim 1, thereby mutually orienting spontaneous expansive flows of "die swells" of said extrusion material in reciprocal directions of mutual intersection to provide a multi-lumen, tubular, extruded product with a multi-coronal arrangement.

13. The method of claim 12, wherein the multi-lumen, tubular, extruded product has linear internal walls.

* * * * *